US006695567B2

(12) United States Patent
Nagata et al.

(10) Patent No.: US 6,695,567 B2
(45) Date of Patent: Feb. 24, 2004

(54) HYDRAULIC DEVICE FOR INDUSTRIAL VEHICLES

(75) Inventors: Hisao Nagata, Kariya (JP); Seiji Nakashima, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/795,063

(22) Filed: Feb. 26, 2001

(65) Prior Publication Data

US 2001/0030085 A1 Oct. 18, 2001

(30) Foreign Application Priority Data

Feb. 28, 2000 (JP) .................................. 2000-051574
Jan. 26, 2001 (JP) .................................. 2001-018840

(51) Int. Cl.[7] .................................................. B66F 9/22
(52) U.S. Cl. ................................................... 414/635
(58) Field of Search ......................................... 414/635

(56) References Cited

U.S. PATENT DOCUMENTS 3,583,585 A * 6/1971 Joyce ........................ 414/694
4,076,302 A * 2/1978 Sable ........................ 296/65 R
4,164,121 A * 8/1979 Houseman ................... 60/486
5,201,629 A * 4/1993 Simpson et al. ............. 414/632
5,370,494 A * 12/1994 Holmes et al. ............. 414/635

FOREIGN PATENT DOCUMENTS

| JP | 5357624 | * 5/1978 | |
| JP | 56-84600 | 12/1979 | |
| JP | 56-23200 | 3/1981 | |
| JP | 8-301595 | 11/1996 | B66F/9/22 |
| JP | 9110397 | * 4/1997 | |

* cited by examiner

Primary Examiner—Steven A. Bratlie
(74) Attorney, Agent, or Firm—Morgan & Finnegan, LLP

(57) ABSTRACT

A hydraulic device for industrial vehicles. A first motor drives a first hydraulic pump and a second hydraulic pump. The first hydraulic pump supplies hydraulic fluid to a power steering device and a brake device. The second hydraulic pump supplies hydraulic fluid to a carriage device. If an increased amount of hydraulic fluid need be supplied to the carriage device, a second motor drives a third hydraulic pump. Thus, together with the second hydraulic pump, the third hydraulic pump supplies hydraulic fluid to the carriage device.

13 Claims, 6 Drawing Sheets

HYDRAULIC DEVICE FOR INDUSTRIAL VEHICLES

BACKGROUND OF THE INVENTION

The present invention relates to hydraulic devices for industrial vehicles, and, more particularly, to hydraulic devices preferably used in battery type forklifts.

Generally, a battery type forklift has a motor for driving wheels. The forklift further includes a power steering device and a carriage device that are operated through hydraulic pressure. In other words, the power steering device and the carriage device are supplied with hydraulic fluid from a hydraulic pump. The hydraulic pump is activated by a motor. The motor for driving the wheels and the motor for activating the hydraulic pump are powered by a battery, which is installed in the interior of a body frame of the forklift.

FIG. 7 shows a hydraulic device for a battery type forklift that is described in Japanese Unexamined Utility Model Publication No. 56-84600. The hydraulic device has a pair of hydraulic pumps 81, 82 that supply hydraulic fluid to a cylinder 80 of a carriage device. The hydraulic pump 81 is activated by a motor 83, and the hydraulic pump 82 is activated by a motor 84. When only the pump 81 is activated, the cylinder 80 is operated at a relatively low speed. When both pumps 81, 82 are activated, the cylinder 80 is operated at a relatively high speed.

In addition to the cylinder 80, the hydraulic pumps 81, 82 supply hydraulic fluid to a power steering device (not shown) through a throttle valve 95. If the power steering device is operated together with the cylinder 80, the hydraulic pump 81 must constantly supply hydraulic fluid to the power steering device and the cylinder 80, regardless of the speed at which the cylinder 80 is operated. The displacement of the pump 81 must thus be relatively large. Also, the motor 83, which activates the pump 81, is formed relatively large to increase the output of the motor 83. The motor 83 thus consumes a relatively large power supplied from a battery. Further, even when only the power steering device is operated, the motor 83 consumes the battery power by driving the pump 81. This shortens durability of the battery.

FIG. 8 shows a hydraulic device described in Japanese Unexamined Patent Publication No. 56-23200. The hydraulic device has a tandem pump that includes a carriage pump 85 and a power steering pump 86. The carriage pump 85 and the power steering pump 86 are driven by a motor 87. The motor 87 is controlled by a controller 88.

A pair of tilt cylinders 90 and a lift cylinder 89 actuate a carriage device. The tilt cylinders 90 are connected to the carriage pump 85 through a tilt valve 97. The lift cylinder 89 is connected to the carriage pump 85 through a lift valve 98. A power steering cylinder 91 is connected to the power steering pump 86 through a steering control valve 99.

Since the motor 87 must drive the carriage pump 85 and the power steering pump 86, the motor 87 is formed relatively large to increase the output of the motor 87. This increases power consumption of the motor 87.

SUMMARY OF THE INVENTION

Accordingly, it is an objective of the present invention to provide a hydraulic device for industrial vehicles that lowers power consumption while improving carriage performance.

To achieve the foregoing and other objectives and in accordance with the purpose of the present invention, the invention provides a hydraulic device for an industrial vehicle that operates a carriage device and a traveling device by supplying the carriage device and the traveling device with hydraulic fluid discharged by a hydraulic pump driven by a motor.

The hydraulic device includes a first hydraulic pump for supplying the hydraulic fluid to the traveling device, a second hydraulic pump for supplying the hydraulic fluid to the carriage device, wherein the second hydraulic pump and the first hydraulic pump together form a tandem pump, a first motor for driving the first hydraulic pump and the second hydraulic pump, a third hydraulic pump for supplying the hydraulic fluid to the carriage device, wherein the third hydraulic pump is operated in accordance with an operation amount of the carriage device, and a second motor for driving the third hydraulic pump.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

An embodiment of a hydraulic device for an industrial vehicle according to the present invention will now be described with reference to FIGS. 1 to 3.

Figure 3:
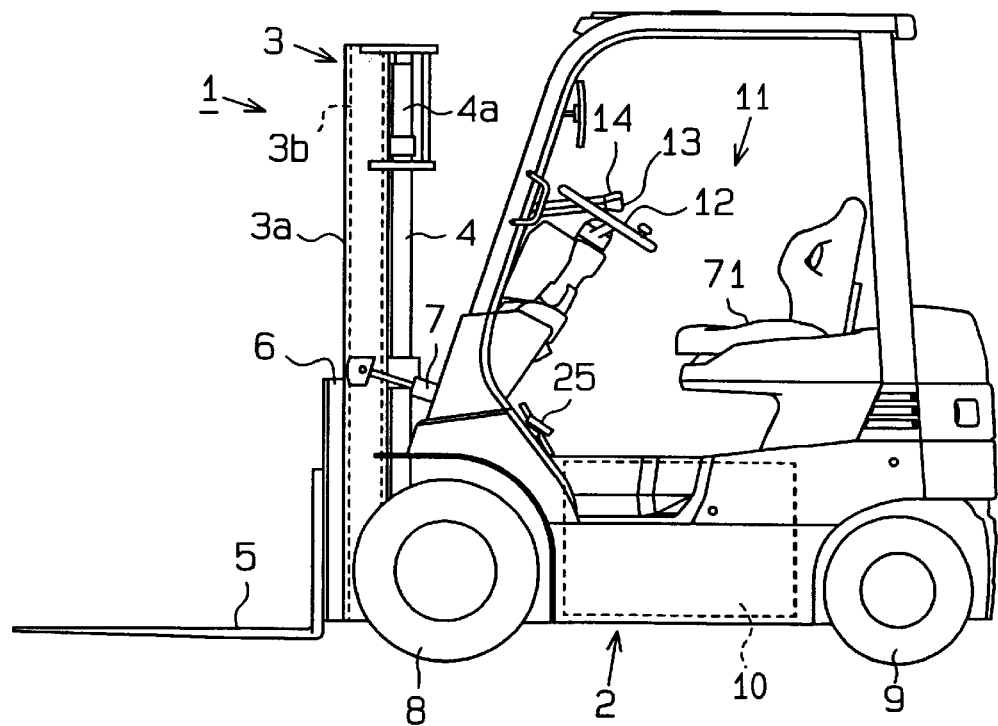
FIG. 3 is a side view showing an example of an industrial vehicle provided with the hydraulic device of FIG. 1.

FIG. 3 shows a battery type forklift 1 provided with a hydraulic device according to the present invention.

The forklift 1 includes a pair of masts 3 that extends from a front portion of a body frame 2. Each mast 3 includes an outer mast 3a and an inner mast 3b. The outer mast 3a is supported by the body frame 2 to tilt forward or rearward with respect to the body frame 2. The inner mast 3b is supported by the outer mast 3a to move upward or downward. A lift cylinder 4 is located at the rear of the inner mast 3b. A housing of the lift cylinder 4 is secured to the outer mast 3a. A piston rod 4a of the lift cylinder 4 is connected to an upper portion of the inner mast 3b. A lift bracket 6 is located along an inner side of the inner mast 3b. The lift bracket 6 is supported by the inner mast 3b to move upward or downward. Although not illustrated, a chain wheel is provided at the upper portion of the inner mast 3b. A chain is wound around the chain wheel. An end of the chain is secured to the lift bracket 6, and the other end of the chain is secured to the body frame 2. A fork 5 is secured to the lift bracket 6. When the piston rod 4a of the lift cylinder 4 is projected, the inner mast 3b moves upward to raise the fork 5 together with the lift bracket 6. When the rod 4a of the lift cylinder 4 is retracted, the inner mast 3b moves downward to lower the fork 5 together with the lift bracket 6.

A tilt cylinder 7 is located between the mast 3 and the body frame 2. A housing of the tilt cylinder 7 is rotationally supported by the body frame 2, and a piston rod of the tilt cylinder 7 is rotationally supported by a side of the outer mast 3a. When the piston rod of the tilt cylinder 7 is projected, the mast 3 tilts forward. When the piston rod of the tilt cylinder 7 is retracted, the mast 3 tilts rearward.

The forklift 1 includes a pair of front wheels 8 that are located at opposite sides of the body frame 2. An axle of the front wheels 8 is supported by the body frame 2. The front wheels 8 are driving wheels. The forklift 2 also includes a pair of rear wheels 9 that are located at opposite sides of the body frame 2. The rear wheels 9 are steered wheels. Each rear wheel 9 is rotationally supported by a hub carrier. The hub carrier is rotationally supported by the body frame 2 through a king pin. A battery 10 is installed in the interior of the body frame 2. The forklift 1 has a pair of motors powered by the battery 10. One motor drives the front wheels 8, and the other drives a hydraulic device. The hydraulic device operates the lift cylinder 6 and the tilt cylinder 7.

An operating compartment 11 includes a steering wheel 12, a lift lever 13, a tilt lever 14, a brake pedal 25, and a seat 71. The seat 71 is supported by the body frame 2. The steering wheel 12, the lift lever 13, and the tilt lever 14 are located along a front wall of the operating compartment 11. The brake pedal 25 is provided on the floor of the operating compartment 11. Movement of the steering wheel 12, the brake pedal 25, the lift lever 13, and the tilt lever 14 is transmitted to the hydraulic device. The hydraulic device is provided at the body frame 2. In accordance with the transmitted movement, the hydraulic device activates a carriage device, which includes the lift cylinder 4 and the tilt cylinder 7, and a traveling device. The traveling device includes a power steering device 16 and a pair of hydraulic brakes 26, which are shown in FIG. 1.

Figure 1:
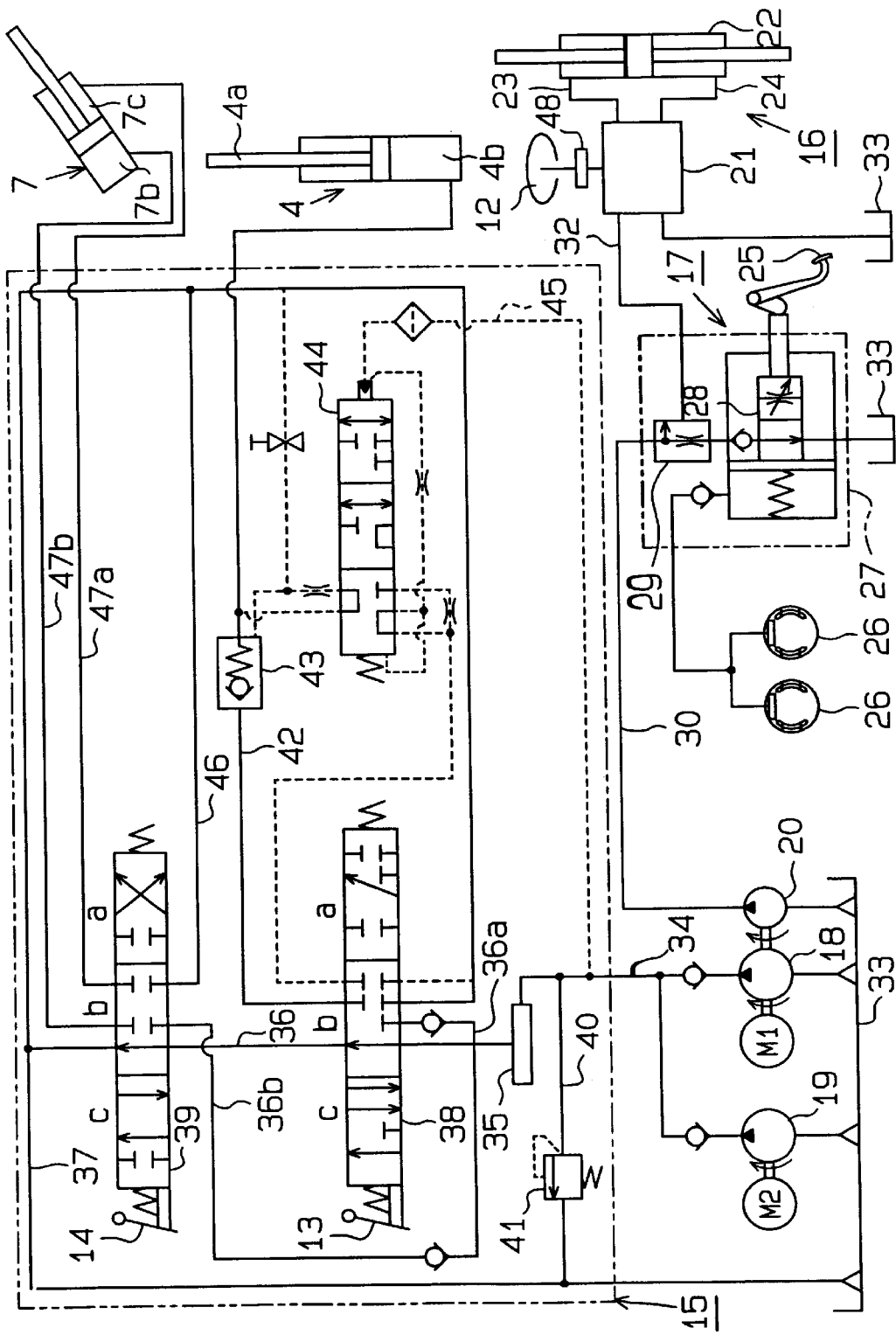
FIG. 1 is a block diagram showing a hydraulic circuit formed by a hydraulic device for an industrial vehicle of an embodiment according to the present invention.

As shown in FIG. 1, the hydraulic device includes an oil control valve 15, a first hydraulic pump 20, a second hydraulic pump 18, and a third hydraulic pump 19. The oil control valve 15 has a locking circuit for selectively locking and unlocking the lift cylinder 4. The oil control valve 15 includes a lift valve 38, a tilt valve 39, a pilot operation check valve, or a pilot check valve 43, and a pilot switch valve 44. The lift cylinder 4 and the tilt cylinder 7 are connected to the second hydraulic pump 18 and the third hydraulic pump 19 through the oil control valve 15. The hydraulic brakes 26 and the power steering device 16 are connected to the first hydraulic pump 20 through a brake valve 27.

The second hydraulic pump 18 is activated together with the first hydraulic pump 20 when the forklift is started. That is, the second hydraulic pump 18 is operated even when the third hydraulic pump 19 is not operated. The third hydraulic pump 19 is an auxiliary pump that is activated only when the amount of hydraulic fluid supplied to the oil control valve 15 need be increased. More specifically, in this embodiment, the lifting speed of the fork 5 is switched between two levels in accordance with the position of the lift lever 13, which is manipulated by the forklift operator. If the lift lever 13 is switched to a high speed mode, the third hydraulic pump 19 is activated to cooperate with the second hydraulic pump 18. This increases the amount of hydraulic fluid supplied to the oil control valve 15. The moving speed of the fork 5 is thus increased. The displacement of the second hydraulic pump 18 is equal to that of the third hydraulic pump 19. The displacement of the hydraulic pumps 18, 19 is greater than the displacement of the first hydraulic pump 20.

The hydraulic device of this embodiment includes a pair of motors M1, M2. The motor M1 drives the first hydraulic pump 20 and the second hydraulic pump 18, which form a tandem pump. The motor M2 drives the third hydraulic pump 19. The hydraulic device of FIG. 1 thus has two motors and three pumps. The motors M1, M2 are identically configured. Hereinafter, the motor M1 is referred to as "main motor", and the motor M2 is referred to as "auxiliary motor".

A steering cylinder 22 is a multiple movement type and is supported by the body frame 2 to extend parallel with the front wheel axle. The steering cylinder 22 has a pair of piston rods, and each piston rod is connected to the hub carrier of the associated rear wheel 9. A pair of fluid chambers are provided at opposite sides of the piston of the steering cylinder 22. One fluid chamber is connected to a steering valve 21 through a line 23, and the other fluid chamber is connected to the steering valve 21 through a line 24.

A brake device 17 includes the hydraulic brakes 26 and the brake valve 27. Each hydraulic brake 26 is installed in the associated front wheel 8 of the forklift 1. The hydraulic brake 26 is a drum type and has a brake cylinder that presses a pair of brake shoes against a brake drum. The brake valve 27 includes a brake pressure control valve 28 and a distribution valve 29. The brake valve 27 supplies hydraulic oil to the hydraulic brakes 26 in accordance with a depression amount of the brake pedal 25. The brake pressure control valve 28 has a spring chamber that accommodates a spring. The spring chamber is connected to the brake cylinder of each hydraulic brake 26 through a check valve. The distribution valve 29 is located upstream of the brake pressure control valve 28.

When the brake pedal 25 is not depressed, the brake pressure control valve 28 connects an outlet port of the distribution valve 29 to an associated fluid reservoir 33, as shown in FIG. 1. In this state, hydraulic fluid is circulated from the first hydraulic pump 20 to the fluid reservoir 33. When the brake pedal 25 is depressed, a piston in the brake pressure control valve 28 is moved in accordance with pressure caused by fluid from the first hydraulic pump 20 and movement of the brake pedal 25. This supplies pressurized hydraulic fluid to the brake cylinder of each hydraulic brake 26.

The first hydraulic pump 20 is connected to the distributing vale 29 of the brake valve 27 through a line 30. The distribution valve 29 supplies hydraulic fluid to the brake pressure control valve 28. Also, the distribution valve 29 distributes hydraulic fluid to the steering valve 21 through a line 32. The brake valve 27 and the steering valve 21 are connected to the associated fluid reservoirs 33. That is, the brake valve 27 and the steering valve 21 are connected in parallel with each other between the first hydraulic pump 20 and the fluid reservoirs 33.

The inlet of the oil control valve 15 is connected to the outlets of the second and third hydraulic pumps 18, 19. The outlet of the oil control valve 15 is connected to a lift cylinder 4, a tilt cylinder 7, and a fluid reservoir 33. More specifically, hydraulic fluid flows from the first and second hydraulic pumps 18, 19 to a line 36 through the line 34. The fluid is then circulated to an associated fluid reservoir 33 through a return passage 37. The lift valve 38 and the tilt valve 39 are connected in series with each other in the line 36. A line 40 connects the line 36 to the return passage 37. A relief valve 41 is located in the line 40. A valve 35 is located in the line 36. The valve 35 is a throttle valve for adjusting the pressure in the line 36 to a predetermined value.

The lift valve 38 is a three position type spool valve. When the operator moves the lift lever 13 to a lifting position, a neutral position, and a lowering position, the spool of the lift valve 38 is moved to position a, position b, and position c, respectively. If the spool of the lift valve 38 is located at the neutral position, or position b, as shown in FIG. 1, hydraulic fluid is circulated from the second and third pumps 18, 19 to the associated reservoir 33 through the line 36 and the return passage 37. If the spool of the lift valve 38 is located at position a, hydraulic fluid flows from the second and third pumps 18, 19 to the lift cylinder 4 through a branch 36a and a line 42. If the spool of the lift valve 38 is located at position c, hydraulic fluid flows from the second and third pumps 18, 19 to the associated fluid reservoir 33. Meanwhile, hydraulic fluid returned from the lift cylinder 4 is circulated to the associated fluid reservoir 33 through the return passage 37.

The locking circuit, which selectively locks and unlocks the lift cylinder 4, is located in the line 42. When necessary, the locking circuit locks the lift cylinder 4 to prevent the lift cylinder 4 from operating to lower the fork 5. As described above, the locking circuit includes the pilot check valve 43 and the pilot switch valve 44. The pilot check valve 43 is provided in the line 42. When the first and second hydraulic pumps 18, 19 are de-activated, hydraulic fluid returned from the lift cylinder 4 is sent to the pilot check valve 43. The pilot check valve 43 thus functions as a check valve. When the first and second hydraulic pumps 18, 19 are activated, a spool of the switch valve 44 is moved by fluid pressure applied by the pumps 18, 19, thus opening the check valve 43. In this state, if the spool of the lift valve 38 is moved to a lowering position, or position c, the hydraulic fluid returned from the lift cylinder 4 is circulated to the associated fluid reservoir 33 through the line 42 and the lift valve 38. In this embodiment, the pilot check valve 43 becomes open, for example, one or two seconds after the second hydraulic pump 18 is started.

The tilt valve 39 is a three position type spool valve. The tilt valve 39 is connected to the line 36, a branch 36b, and the return passage 37. The tilt valve 39 is also connected to the tilt cylinder 7 through lines 47a, 47b. The tilt cylinder 7 includes a rod chamber 7c and a bottom chamber 7b. The rod chamber 7c is connected to the line 47a, and the bottom chamber 7b is connected to the line 47b.

When the spool of the tilt valve 39 is located at position b, hydraulic fluid circulates from the second and third hydraulic pumps 18, 19 to the associated reservoir 33 through the line 36 and the return passage 37. When the spool of the tilt valve 39 is located at position a, hydraulic fluid flows from the second hydraulic pump 18 to the rod chamber 7c of the tilt cylinder 7 through the branch 36b and the line 47a, thus retracting the rod. When the spool of the tilt valve 39 is located at position c, hydraulic fluid flows from the second hydraulic pump 18 to the bottom chamber 7b of the tilt cylinder 7 through the branch 36b and the line 47b, thus projecting the rod.

Figure 2:
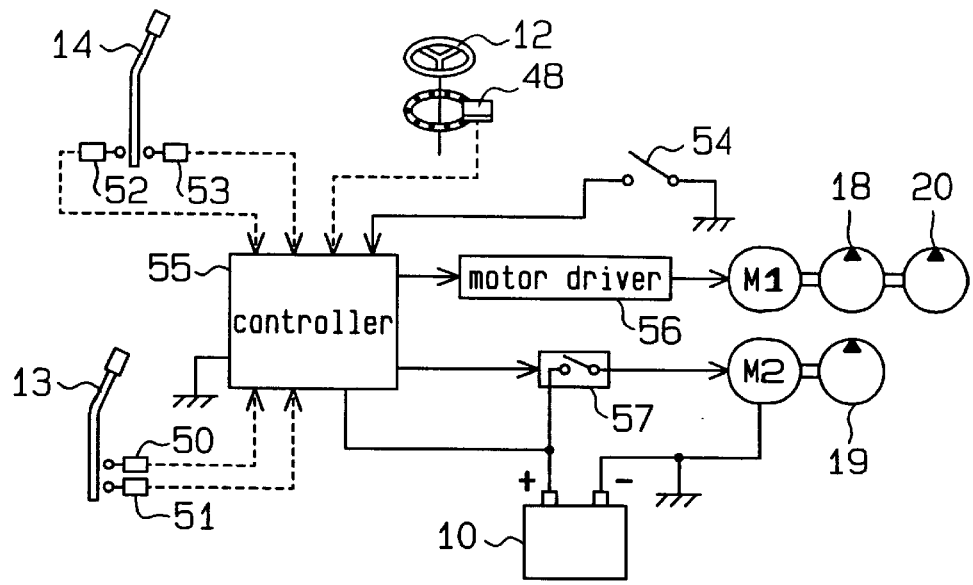
FIG. 2 is a diagrammatic view showing the hydraulic device of FIG. 1 in a powered state.

The hydraulic device is controlled by a controller 55 shown in FIG. 2. The controller 55 includes a microprocessor. The controller 55 is connected to a steering angle sensor 48, a pair of lift switches 50, 51, a pair of tilt switches 52, 53, a main switch 54, a motor driver 56 for driving the motor M1, a motor switch 57, and the battery 10. The steering angle sensor 48 generates a signal in accordance with an angle at which the steering wheel 12 is rotated. The switches 50 to 53 are micro-switches and are normally in a turned-off state.

The lift switches 50, 51 are selectively turned on and off by manipulating the lift lever 13. The lift lever 13 is switched among a neutral position, a normal speed lifting position, a high speed lifting position, and a lowering position. When the lift lever 13 is switched to the neutral position or the lowering position, the lift switches 50, 51 are both turned off. When the lift lever 13 is switched to the normal speed lifting position, the lift switch 50 is turned on. When the lift lever 13 is switched to the high speed lifting position, both lift switches 50, 51 are turned on.

The tilt switches 52, 53 are selectively turned on and off by manipulating the tilt lever 14. The tilt lever 14 is switched among a neutral position, a forward tilting position, and a rearward tilting position. When the tilt lever 14 is switched to the neutral position, both switches 52, 53 are turned off. When the tilt lever 14 is switched to the forward tilting position, the switch 52 is turned on. When the tilt lever 14 is switched to the rearward tilting position, the switch 53 is turned on. When the tilt switch 52 is turned on, the controller 55 tilts the mast 3 forward. When the tilt switch 53 is turned on, the controller 55 tilts the mast 3 rearward.

The main switch 54 is a master switch for selectively turning on and off the hydraulic device. The motor driver 56 corresponds to the main motor M1 and drives the motor M1 in accordance with a signal from the controller 55. The motor switch 57 is located between the battery 10 and the auxiliary motor M2. The motor switch 57 is selectively turned on and off in accordance with a signal from the controller 55 to connect or disconnect the motor M2 with respect to the battery 10.

The operation of the hydraulic device will hereafter be described.

When the hydraulic device is de-activated, the hydraulic pumps 18 to 20 are also de-activated. In this state, pressure in a pilot line 45 is relatively low, and the pilot check valve 43 is closed. The lift cylinder 4 is locked.

When the main switch 54 is turned on, the controller 55 is powered by the battery 10. The controller 55 thus sends a signal to the motor driver 56 to activate the main motor M1. Accordingly, the second hydraulic pump 18 and the first hydraulic pump 20 are activated. Afterwards, when the pressure in the pilot line 45 exceeds a predetermined value, the pilot switch valve 44 is operated such that the pilot check valve 43 is opened. As a result, the lift cylinder 4 is unlocked. Meanwhile, the first hydraulic pump 20 supplies hydraulic fluid to the brake valve 27. In this state, the hydraulic brakes 26 are operated by depressing the brake pedal 25.

If the lift lever 13 and the tilt lever 14 are each located at the neutral position, hydraulic fluid from the second hydraulic pump 18 enters the oil control valve 15 and passes through the lift valve 38 and the tilt valve 39. The fluid is eventually circulated to the associated fluid reservoir 33 through the return passage 37.

Further, the controller 55 starts its process when the main switch 54 is turned on. That is, based on the states of the switches 50 to 53 and a signal from the steering angle sensor 48, the controller 55 judges which procedure among "starting", "steering", "normal speed lifting", "high speed lifting", or "tilting" should be performed. The controller 55 controls the output of the main motor M1 in accordance with the judgement.

More specifically, when the main switch 54 is turned on, the controller 55 instructs the motor driver 56 to drive the motor M1 at a first output value V1. If the controller 55 receives a signal from the steering angle sensor 48, the controller 55 instructs the motor driver 56 to drive the motor M1 at a second output value V2. If the lift lever 13 is located at the normal speed lifting position or the tilt lever 14 is located at the forward or rearward tilting position, the controller 55 instructs the motor driver 56 to drive the motor M1 at a third output value V3. The first to third values satisfy the following condition: first output value V1<second output value V2<third output value V3. The third output value V3 corresponds to 100% output of the main motor M1.

When the forklift 1 is operated and the operator depresses the brake pedal 25, hydraulic fluid is supplied from the first hydraulic pump 20 to the brake pressure control valve 28 of the brake valve 27. The piston of the brake pressure control valve 28 is moved in accordance with pressure caused by depression of the brake pedal 25 and fluid pressure applied by the first hydraulic pump 20. In this state, hydraulic fluid flows from the spring chamber of the valve 28 to the brake cylinder of each hydraulic brake 26. The brake shoes are thus pressed against the associated drums to brake the forklift 1. The force acting to brake the forklift 1 is larger than the force caused by the depression of the brake pedal 25. When the brake pedal 25 is released, the piston of the brake pressure control valve 28 is urged by the spring such that the fluid from the first hydraulic pump 20 is circulated to the associated reservoir 33. This separates the brake shoes from the associated brake drums, thus permitting the forklift 1 to move. The relief pressure of the brake valve 27 is, for example, 130 kgf/cm².

When the forklift 1 is steered and the steering angle sensor 48 outputs a signal, the controller 55 instructs the motor driver 56 to drive the main motor M1 at the second output value V2. In this state, hydraulic fluid is supplied from the first hydraulic pump 20 to the steering valve 21 through the distribution valve 29. The steering valve 21 sends the fluid to the steering cylinder 22 through the line 23 or the line 24, depending on which direction the steering wheel 12 is rotated in. The steering cylinder 22 thus rotates the rear wheels 9 in accordance with the rotational direction of the steering wheel 12. Hydraulic fluid returned from the steering cylinder 22 is circulated to the associated reservoir 33 through the steering valve 21.

The carriage device is operated by manipulating the lift lever 13 or the tilt lever 14. In a state corresponding to FIG. 1, the lift lever 13 and the tilt lever 14 are both located at the neutral position. In this state, hydraulic fluid flows from the second hydraulic pump 18 to the lift valve 38 and the tilt valve 39. The fluid is then circulated to the associated reservoir 33 through the return passage 37.

When the tilt lever 14 is manipulated, the tilt switch 52 or the tilt switch 53 is turned on. The controller 55 then instructs the motor driver 56 to drive the main motor M1 at the third output value V3. More specifically, if the tilt lever 14 is switched to the forward tilting position, the spool of the tilt valve 39 is moved to position c. In this state, hydraulic fluid flows from the second hydraulic pump 18 to the cylinder chamber 7b of the tilt cylinder 7 through the line 47b. The rod of the tilt cylinder 7 is thus projected to tilt the mast 3 forward. Hydraulic fluid is circulated from the rod chamber 7c of the tilt cylinder 7 to the associated reservoir through the line 47a, the tilt valve 39, the line 46, and the return passage 37. If the tilt lever 14 is switched to the rearward tilting position, the spool of the tilt valve 39 is moved to position a. In this state, hydraulic fluid flows from the second hydraulic pump 18 to the rod chamber 7c of the tilt cylinder 7 through the line 47a. The rod of the tilt cylinder 7 is thus retracted to tilt the mast rearward. Hydraulic fluid is circulated from the cylinder chamber 7b to the associated reservoir through the line 47b, the tilt valve 39, the line 46, and the return passage 37.

If the lift lever 13 is switched to the normal speed lifting position, the controller 55 instructs the motor driver 56 to drive the main motor M1 at the third output value V3. Hydraulic fluid flows from the second hydraulic pump 18 to the lift cylinder 4 through the lift valve 38, the line 42, and the pilot check valve 43. The rod 4a of the lift cylinder 4 is thus projected to lift the fork 5. If the lift lever 13 is switched to the neutral position, the spool of the pilot switch valve 44 restores its original position, or the neutral position, to close the pilot check valve 43. This prevents the hydraulic fluid in the lift cylinder 4 from circulating to the associated reservoir 33.

If the lift lever 13 is switched to the high speed lifting position, the controller 55 drives both motors M1, M2. More specifically, the controller 55 maintains the motor switch 57 in a turned-off state as long as both lift switches 50, 51 are turned off or only the lift switch 50 is turned on. However, if the lift switches 50, 51 are both turned on by the lift lever 13, the controller 55 turns on the motor switch 57 to drive the auxiliary motor M2 at 100% output.

In this state, hydraulic fluid flows from the second and third hydraulic pumps 18, 19 to the lift cylinder 4 through the line 34, the lift valve 38, the line 42, and the pilot check valve 43. This increases the amount of hydraulic fluid supplied to the lift cylinder 4, as compared to when the lift lever 13 is located at the normal speed lifting position. The fork 5 is thus lifted at a relatively high speed. If the lift lever 13 is returned to the neutral position, the pilot check valve 43 prevents the fluid in the lift cylinder 4 from circulating to the associated reservoir 33. The fork 5 is thus maintained in a lifted state.

The hydraulic device of this embodiment has the following advantages.

The displacement of the first hydraulic pump 20 need not be increased, as long as it is sufficient for operating the traveling device, which includes the power steering device 16 and the brake device 17. In the same manner, the displacement of the second hydraulic pump 18 need not be increased, as long as it is sufficient for operating the carriage device, which includes the lift cylinder 4 and the tilt cylinder 7, when the lift lever 13 is located at the normal speed lifting position. The first and second hydraulic pumps 20, 18 are thus relatively small. Further, since the third hydraulic pump 19 is activated only when the lift lever 13 is located at the high speed lifting position, the displacement of the third hydraulic pump 19 need not be increased. The third hydraulic pump 19 is thus also relatively small. In other words, since the first to third pumps 20, 18, 19 are all relatively small, the efficiency of these pumps are increased. It is thus unnecessary to increase the output of the main motor M1 and that of the auxiliary motor M2. This decreases power consumption of the motors M1, M2. Further, since the motors M1, M2 are also relatively small, the arrangement of the motors M1, M2 and the pumps 18 to 20 in the forklift 1 is simplified. It is thus easy to install the hydraulic device in the forklift 1.

If the steering wheel 12 is rotated and the tilt lever 14 is located at the forward or rearward tilting position while the lift lever 13 is located at the normal speed lifting position, only the main motor M1 is activated. The auxiliary motor M2 is activated only if the lift lever 13 is located at the high speed lifting position. In other words, the number of the activated motors is selected in accordance with the operational state of the forklift 1. This reduces power consumption, thus increasing durability of the battery 10. Accordingly, the main motor M1 and the auxiliary motor M2 are maintained in an activated state for a prolonged time period.

The first hydraulic pump 20 supplies hydraulic fluid to the hydraulic brakes 26, in addition to the power steering device 16. The second hydraulic pump 18 supplies hydraulic fluid to the locking circuit such that the lift cylinder 4 is unlocked. Hydraulic fluid supplied from the first and second hydraulic pumps 20, 18 is thus consumed efficiently.

The controller 55 controls the output of the main motor M1 and determines whether the auxiliary pump M2 should be activated depending on which of five procedures that include "starting", "steering", "normal speed lifting", "high speed lifting", and "tilting" is performed. That is, the motors M1, M2 are activated in accordance with the operational state of the forklift 1. This reduces power consumption of the motors M1, M2.

The third hydraulic pump 19 is activated to cooperate with the second hydraulic pump 18 only when the lift lever 13 is located at the high speed lifting position. The third hydraulic pump 19 is operated by the auxiliary motor M2 that is provided separate from the main motor M1, which operates the second hydraulic pump 18. Thus, the movement speed of the fork 5 is reliably increased.

Only the output of the main motor M1 is selected among multiple levels, while the auxiliary motor M2 is simply activated or de-activated. This structure simplifies a corresponding electric circuit.

Since the main motor M1 and the auxiliary motor M2 are identically configured, the hydraulic device is easily assembled. This reduces the manufacturing cost of the hydraulic device.

Figure 4:
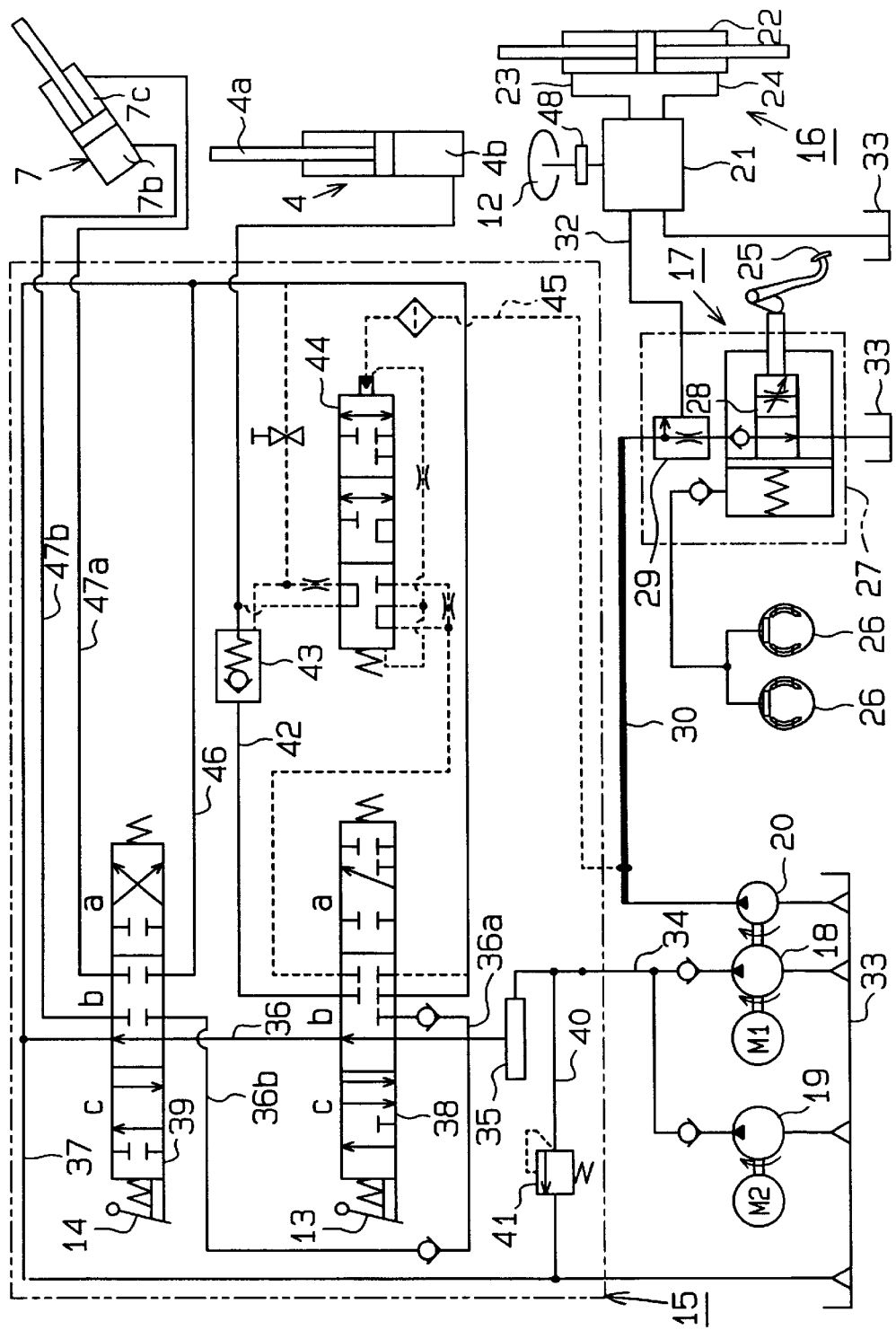
FIG. 4 is a block diagram showing a hydraulic circuit formed by a hydraulic device for an industrial vehicle of another embodiment according to the present invention.

FIG. 4 shows another embodiment of the hydraulic device according to the present invention. FIG. 4 is a block diagram showing a hydraulic circuit formed by the hydraulic device of this embodiment. In the circuit of FIG. 4, unlike that of FIGS. 1 and 2, the pilot line 45 corresponding to the pilot switch valve 44 is connected to the line 30, which is connected to the outlet of the first hydraulic pump 20. The remaining structure of the hydraulic device of FIG. 4 is identical to that of the hydraulic device of FIGS. 1 and 2.

In this hydraulic device, the lift cylinder 4 is unlocked through fluid pressure applied by the first hydraulic pump 20. Accordingly, the displacement of the second hydraulic pump 18 is relatively small, thus reducing load acting on the main motor M1.

Figure 5:
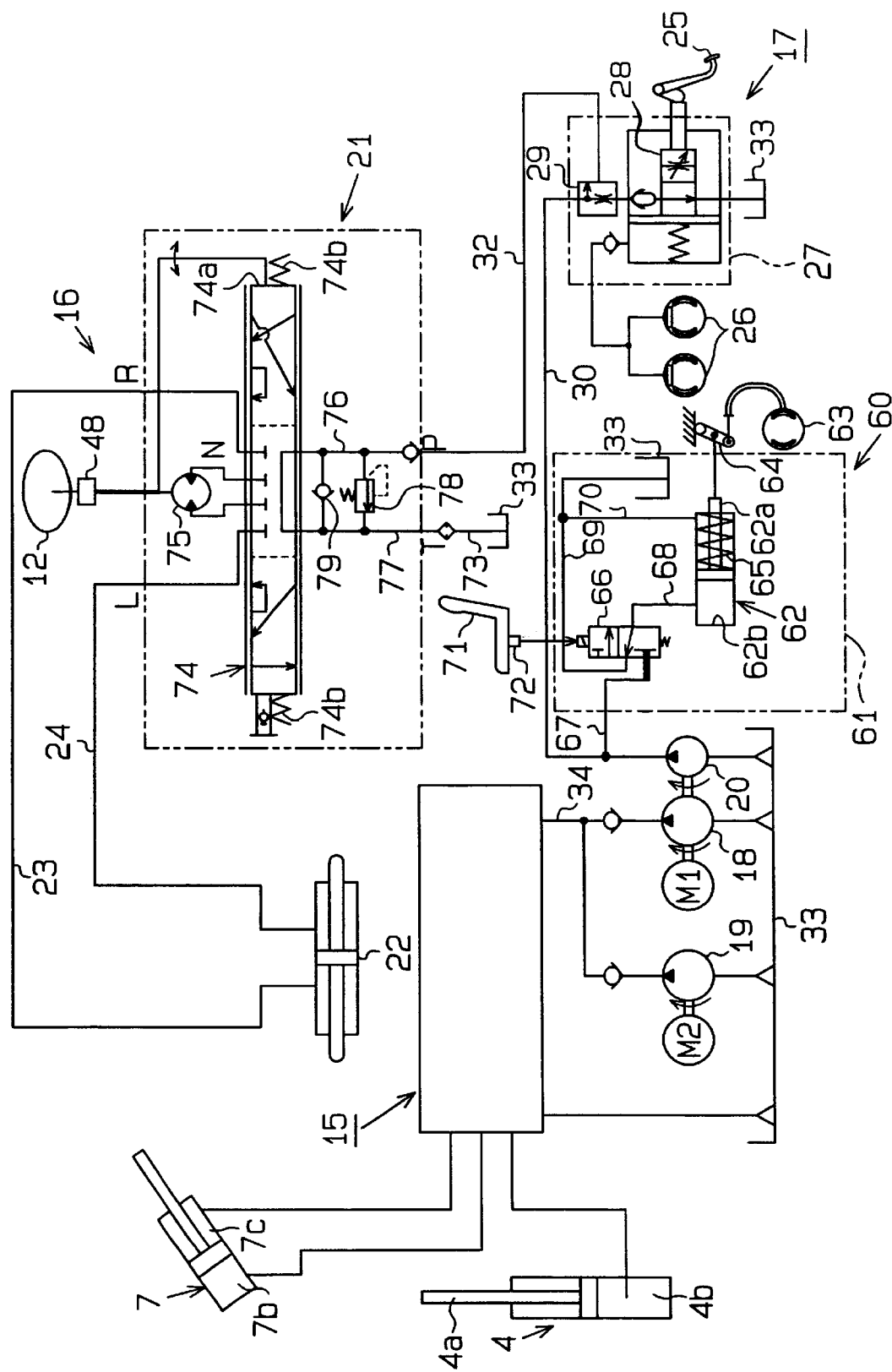
FIG. 5 is a block diagram showing a hydraulic circuit formed by a hydraulic device for an industrial vehicle of another embodiment according to the present invention.
Figure 6:
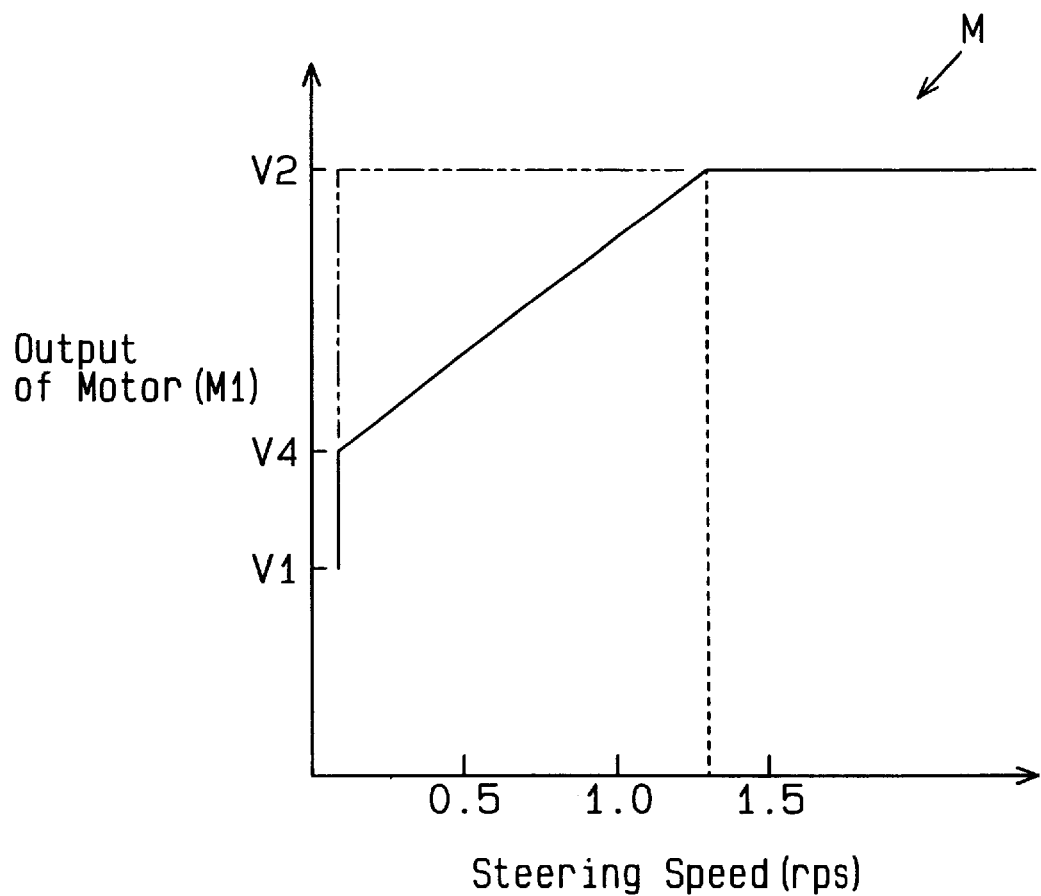
FIG. 6 is a graph showing the relationship between steering speed and motor output of the hydraulic device shown in FIG. 4.
Figure 7:
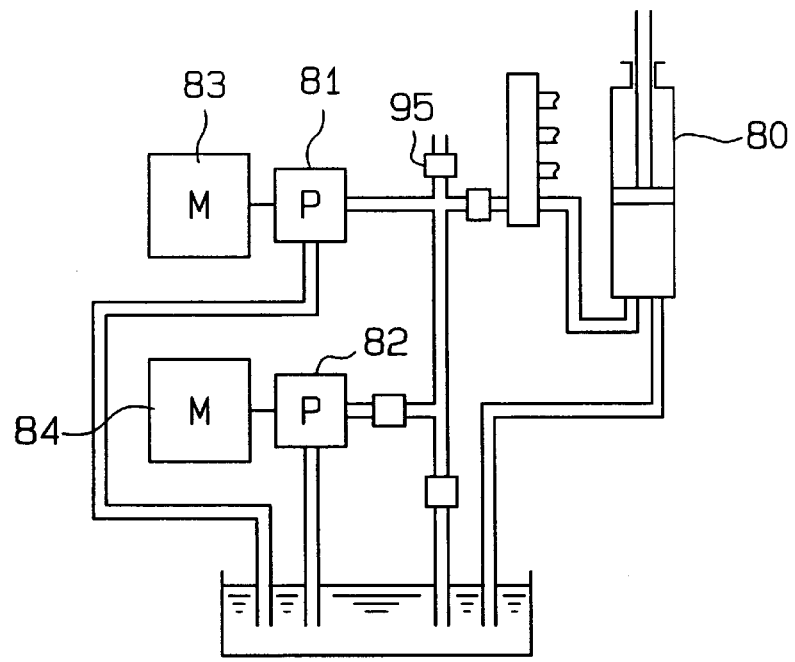
FIG. 7 is a diagrammatic view explaining an example of a prior art hydraulic device.
Figure 8:
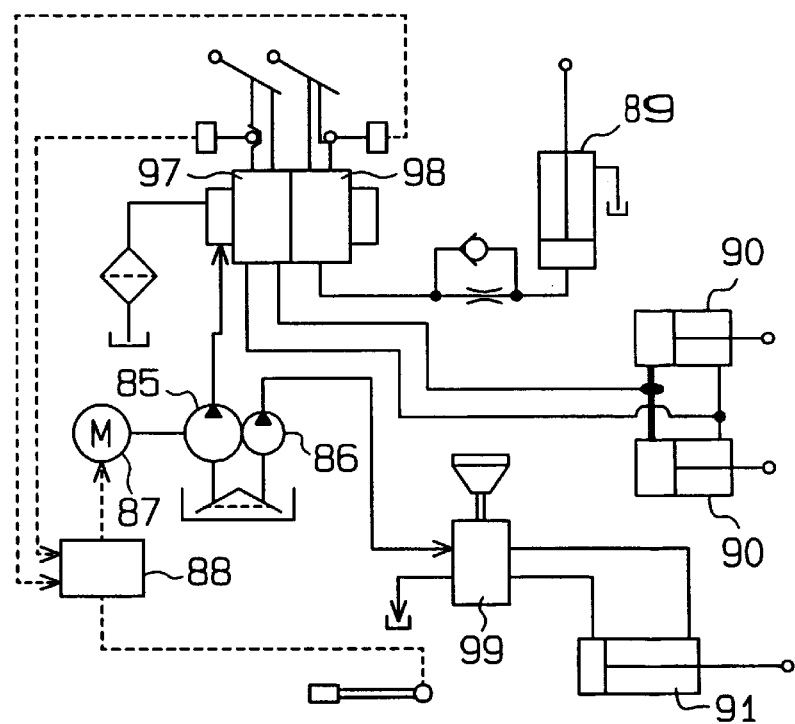
FIG. 8 is a diagrammatic view explaining another example of a prior art hydraulic device.

FIGS. 5 and 6 show another embodiment of the hydraulic device according to the present invention.

The hydraulic device of FIG. 5 is also installed in the battery type forklift 1. The hydraulic device is different from the hydraulic device of FIGS. 1 and 2 in the following points. Firstly, the forklift is automatically braked when the seat becomes empty. Secondly, the output of the motor M1 that drives the tandem motor changes in accordance with the steering speed of the steering wheel 12.

As shown in FIG. 5, the hydraulic device includes two motors and three pumps. The second hydraulic pump 18 and the first hydraulic pump 20 form the tandem pump.

Like the embodiment of FIGS. 1 and 2, the second hydraulic pump 18 and the third hydraulic pump 19 of FIG. 5 are connected to the inlet of the oil control valve 15 through the line 34. The outlet of the oil control valve 15 is connected to the lift cylinder 4 and the tilt cylinder 7. Although not illustrated, the oil control valve 15 includes a lift valve, a tilt valve, a pilot check valve, and a pilot valve. The pilot check valve and the pilot valve cooperate to selectively lock and unlock the lift cylinder 4.

The first hydraulic pump 20 supplies hydraulic fluid to the hydraulic brakes 26 and the power steering device 21. The brake valve 27, like that of the hydraulic device of FIGS. 1 and 2, selectively activates and de-activates the hydraulic brakes 26. The first hydraulic pump 20 supplies fluid also to an additional brake device 60 and the steering valve 21 of the power steering device 17.

The additional brake device 60 includes a deadman brake 63 and an additional brake valve 61.

The deadman brake 63 is mechanically operated by a wire. The deadman brake 63 is a drum type and has a drum connected to, for example, the output of a motor for driving the wheels (not shown). An arm 64 is secured by the body frame 2 of the forklift 1. The deadman brake 63 is activated or de-activated by rotating the arm 64.

The inlet of the additional brake valve 61 is connected to a branch 67 of the line 30, which connects the first hydraulic pump 20 to the brake valve 27. The outlet of the additional brake valve 61 is connected to an associated fluid reservoir 33 through a line 69. The additional brake valve 61 includes a brake cylinder 62 and an electromagnetic switch valve 66. The brake cylinder 62 has a housing and a piston 62a, which is accommodated in the housing. The piston 62a is connected to the arm 64 through, for example, a link mechanism. In a state of FIG. 5, the piston 62a is urged leftward by a spring 65, as viewed in the drawing. The arm 64 thus moves the brake wire to activate the deadman brake 63. When hydraulic fluid is supplied to a fluid chamber 62b, the fluid urges the piston 62a rightward, against the force of the spring 65. Accordingly, the arm 64 is rotated counterclockwise as viewed in FIG. 5, thus de-activating the deadman brake 63.

The electromagnetic switch valve 66 is connected to the outlet of the first hydraulic pump 20 through the branch 67. The switch valve 66 is also connected to the fluid chamber 62b of the brake cylinder 62 through a line 68. The switch valve 66 is further connected to the associated reservoir 33 through the line 69. The electromagnetic switch valve 66 is a two-position type. In a normal state, the electromagnetic switch valve 66 connects the brake cylinder 62 to the line 69, thus circulating the fluid in the fluid chamber 62b to the associated reservoir 33. When the spool of the switch valve 66 is moved, hydraulic fluid is supplied from the first hydraulic pump 20 to the fluid chamber 62b of the brake cylinder 62 through the switch valve 66. A line 70 constantly connects the line 69 to a spring chamber that accommodates the spring 65 of the brake cylinder 62, thus maintaining the pressure in the spring chamber at an atmospheric level.

A seat 71 includes a deadman sensor 72. The deadman sensor 72 includes, for example, a switch. The switch is turned on when the seat 71 is occupied and is turned off when the seat 71 is empty. The deadman sensor 72 is activated if the switch is turned on and is de-activated if the switch is turned off. The electromagnetic switch valve 66 is operated in accordance with the activated or deactivated state of the deadman sensor 72. When the deadman sensor 72 is activated, the spool of the switch valve 66 is moved downward, as viewed in FIG. 5. In this state, hydraulic fluid is supplied from the first hydraulic pump 20 to the fluid chamber 62b of the brake cylinder 62 through the branch 67 and the line 68. Accordingly, the piston 62a is moved rightward, as viewed in FIG. 5, such that the arm 64 is rotated counterclockwise for de-activating the deadman brake 63.

If the deadman sensor 72 is de-activated, the spool of the electromagnetic switch valve 66 restores the position shown in FIG. 5. The fluid chamber 62b of the brake cylinder 62 is thus connected to the lines 68, 69, and the fluid in the fluid chamber 62b flows to the associated reservoir 33 through the lines 68, 69. Accordingly, the spring 65 urges the piston 62a of the brake cylinder 62 leftward. This rotates the arm 64 clockwise to activate the deadman brake 63. Also, if the forklift 1 is stopped, power source is turned off such that the deadman sensor 72 is deactivated. In this state, the switch valve 66 connects the fluid chamber 62b of the brake cylinder 62 to the associated reservoir 33. The piston 62a is thus urged by the spring 65 to activate the deadman brake 63.

The steering valve 21 of the power steering device 16 includes a pump port P, a tank port T, a supply port R, and a discharge port L. The pump port P is connected to the distribution valve 29 of the brake valve 27 through the line 32. The first hydraulic pump 20 supplies hydraulic fluid to the steering valve 21 through the line 30, the distribution valve 29, and the line 32. The tank port T is connected to an associated fluid reservoir 33 through a line 73. The supply port R and the discharge port L are connected to the steering cylinder 22 through the line 23 and the line 24, respectively.

Like the steering valve 21 of FIG. 1, the steering valve 21 of FIG. 5 makes it easy to steer the forklift 1. However, the steering valve 21 of FIG. 5 changes the amount of hydraulic fluid supplied to the steering cylinder 22 in accordance with the speed at which the steering wheel 12 is rotated, or the number of rotation of the steering wheel 12.

The steering valve 21 includes a switch valve 74, a steering pump 75, a relief valve 78, and a check valve 79. The switch valve 74 is connected to the pump port P through a line 76 and to the tank port T through a line 77. The relief valve 78 and the check valve 79 connect the line 76 to the line 77. The relief valve 78 adjusts the pressure of the hydraulic fluid supplied to the switch valve 74. The steering cylinder 22 is connected to the switch valve 74 through the lines 23, 24.

The switch valve 74 determines the direction in which hydraulic fluid flows. The switch valve 74 has a spool 74a and a pair of springs 74b. The springs 74b maintain the spool 74a at a neutral position. When the steering wheel 12 is rotated, the spool 74a is moved rightward or leftward, as viewed in FIG. 5. The steering pump 75 thus supplies hydraulic fluid to the steering cylinder 22.

If the spool 74a of the switch valve 74 is located at the neutral position, or the steering wheel 12 is not rotated, the switch valve 74 circulates the fluid sent from the first hydraulic pump 20 to the associated reservoir 33. If the steering wheel 12 is rotated in one direction such that the spool 74a of the switch valve 74 is moved rightward, the line 76 is connected to a corresponding inlet of the steering pump 75. Further, a corresponding outlet of the steering pump 75 is connected to the line 23, and the line 24 is connected to the line 77. If the steering wheel 12 is rotated in the other direction such that the spool 74a of the switch valve 74 is moved leftward, the line 76 is connected to a corresponding inlet of the steering pump 75. Further, a corresponding outlet of the steering pump 75 is connected to the line 24, and the line 23 is connected to the line 77.

The steering pump 75 is operated in accordance with the rotation of the steering wheel 12. As described, the steering pump 75 switches its outlet and inlet depending on which direction the steering wheel 12 is rotated in. More specifically, if the steering wheel 12 is rotated rightward, the steering pump 75 is supplied with hydraulic fluid from a corresponding inlet in accordance with the steering amount of the steering wheel 12. The steering pump 75 then discharges hydraulic fluid from a corresponding outlet. If the steering wheel 12 is rotated leftward, the steering pump 75 is supplied with hydraulic fluid from a corresponding inlet in accordance with the steering amount of the steering wheel 12. The steering pump 75 then discharges hydraulic fluid from a corresponding outlet. In other words, the inlet for the leftward rotation of the steering wheel 12 functions as the outlet for the rightward rotation of the steering wheel 12. In the same manner, the outlet for the leftward rotation of the steering wheel 12 functions as the inlet for the rightward rotation of the steering wheel 12.

The controller 55 for the hydraulic device of FIG. 5 is different from the controller 55 for the hydraulic device of FIGS. 1 and 2 in the following points. That is, the controller 55 for the device of FIG. 5 has the electromagnetic switch valve 66. Further, the controller 55 for the device of FIG. 5 detects a steering angle θH and a steering speed VH in accordance with a signal from the steering angle sensor 48. The remaining configuration of the controller 55 for the device of FIG. 5 is identical to that for the device of FIGS. 1 and 2.

As shown in FIG. 2, the controller 55 for the device of FIG. 5 is connected to the steering angle sensor 48, the lift switches 52, 53, the tilt switches 50, 51, the main switch 54, the motor driver 56 for driving the main motor M1, and the motor switch 57 for activating the auxiliary motor M2. As described, the controller 55 detects the steering angle θH and the steering speed VH in accordance with a signal from the steering angle sensor 48.

More specifically, the steering angle sensor 48 includes a rotary encoder. The pulse number of the steering angle sensor 48 is varied in relation to the rotation amount of the steering wheel 12. The steering angle sensor 48 generates a pair of pulse signals PA, PB. The phase of the signal PA is offset from that of the signal PB by 90 degrees. The steering angle sensor 48 further generates a reference position pulse signal PC each time the steering wheel 12 restores a reference position. The controller 55 detects the steering angle θH and the steering speed VH in accordance with the signals PA, PB. More specifically, the controller 55 detects the steering direction by comparing the signals PA, PB and counts the pulse number of each signal PA, PB based on the steering direction. The obtained count corresponds to the steering angle θH. The steering speed VH is detected by measuring a time interval between pulses generated by the steering angle sensor 48. The inverse number of the measurement corresponds to the steering speed VH. The controller 55 corrects the number measured by its counter each time the steering angle sensor 48 generates the reference position signal PC, thus correcting the steering angle θH periodically.

In this embodiment, when the forklift 1 is started and the steering wheel 12, the lift lever 13, or the tilt lever 14 are manipulated, the controller 55 judges which of the five procedures should be performed based on the states of the switches 50 to 53 and a signal from the steering angle sensor 48, like the other embodiments. As described above, the procedures include "starting", "steering", "normal speed lifting", "high speed lifting", and "tilting". The controller 55 controls the main motor M1 and the auxiliary motor M2 in accordance with the judgement. The hydraulic brakes 26 and the deadman brake 63 are actuated when the displacement of the first hydraulic pump 20 reaches a predetermined value. The value is selected as a displacement of the first hydraulic pump 20 when the first hydraulic pump 20 is driven at the first output value V1.

The controller 55 controls the output of the main motor M1 by changing the voltage of the motor M1 depending on which procedure the controller 55 performs. In this embodiment, when performing only the "steering" procedure, the controller 55 changes the output of the main motor M1 in a range from a fourth output value V4 to the second output value V2, in relation to the steering speed VH. The fourth output value V4 is larger than the first output value V1 at which the motor M1 is started. The first output value V1, the second output value V2, and the fourth output value V4 satisfy the following condition: first output value VI<fourth output value V4<second output value V2.

FIG. 6 is a graph representing the relationship between the steering speed (rps) and the output of the main motor M1. In the graph, the solid line indicates output variation of the motor M1 shown in FIG. 5, while the chain line indicates output variation of the motor M1 shown in FIGS. 1 to 3. In the hydraulic device of FIG. 5, the output of the main motor M1 increases from the fourth output value V4 by a constant rate as the steering speed VH increases. That is, for example, if the steering speed VH is varied in a range from 0.1 (rps) to 1.3 (rps), the output of the main motor M1 gradually increases in accordance with the steering speed VH. However, after the steering speed VH reaches 1.3 (rps) such that the output of the motor M1 becomes the second value V2, the output of the motor M1 remains the second value V2 regardless of the steering speed VH. The controller 55 stores a map M corresponding to the graph of FIG. 6 for selecting the output of the main motor M1 in accordance with the steering speed VH.

The operation of the hydraulic device will hereafter be described.

When the forklift 1 is de-activated, power is turned off such that the deadman sensor 72 is de-activated. In this state, the electromagnetic switch valve 66 connects the fluid chamber 62b of the brake cylinder 62 to the associated reservoir 33. The spring 65 thus urges the piston 62a to maintain the deadman brake 63 in an activated state.

When the seat 71 in occupied and the power is turned on, the deadman sensor 72 is activated. The spool of the electromagnetic switch valve 66 thus moves such that the first hydraulic pump 20 supplies fluid to the fluid chamber 62b of the brake cylinder 62. This moves the piston 62a to rotate the arm 64, thus de-activating the deadman brake 63.

When the operator starts to operate the forklift 1, the controller 55 starts to drive the main motor M1 at the first output value V1. When the forklift 1 is steered, the controller 55 controls the output of the main motor M1 in the range from the fourth value V4 to the second value V2 in accordance with the steering speed VH. More specifically, the controller 55 computes the steering angle θH and the steering speed VH in accordance with a signal from the steering angle sensor 48. The controller 55 thus determines the output of the main motor M1 as referring to the map M corresponding to FIG. 6. The controller 55 then performs a duty ratio control procedure for the motor M1 such that the actual output of the motor M1 becomes the determined value. The output of the main motor M1 is selected in the range from the fourth output value V4 to the second output value V2. The controller 55 drives the motor M1 at a relatively small output if the steering speed VH is relatively low. In contrast, the controller 55 drives the motor M1 at a relatively large output if the steering speed VH is relatively high. The amount of hydraulic fluid discharged by the first hydraulic pump 20 thus corresponds to the steering speed VH. Hydraulic fluid flows to the steering valve 21 through the line 30, the distribution valve 29 of the brake valve 27, and the line 32. The steering valve 21 sends the fluid to a chamber of the steering cylinder 22 that corresponds to the direction in which the steering wheel 12 is rotated. As described, the first hydraulic pump 20 is operated in accordance with the output of the main motor M1. The amount of the fluid supplied to the steering valve 21 thus corresponds to the steering speed VH. This increases steering responsiveness of the forklift 1.

The hydraulic device of FIG. 5 lifts the fork 5 and tilts the mast 3 in the same manner as the device shown in FIGS. 1 and 2. That is, when the operator switches the lift lever 13 to the normal speed lifting position and moves the tilt layer 14 to the forward or rearward tilting position, the controller 55 drives only the motor M1 at the third output value V3 (100% output). In other words, the main motor M1 is driven at a speed corresponding to voltage supply to the motor M1. The discharge amount of hydraulic fluid thus corresponds to the speed of the main motor M1.

When the operator switches the lift lever 13 to the high speed lifting position, the controller 55 drives the auxiliary motor M2 in addition to the main motor M1. The second and third hydraulic pumps 18, 19 thus supply fluid to the lift cylinder 4 through the oil control valve 15. The amount of the fluid supplied to the lift cylinder 4 is thus increased, as compared to when the lift lever 13 is located at the normal speed lifting position. Accordingly, the fork 5 is moved at a relatively high speed.

If the seat 71 becomes empty while the fork 5 is being lifted or the mast 3 is being tilted, the deadman sensor 72 is de-activated. More specifically, the spool of the electromagnetic switch valve 66 thus restores its original position. The fluid in the fluid chamber 62b of the brake cylinder 62 is then sent to the associated reservoir 33 such that the spring 65 urges the piston 62a to rotate the arm 64, thus activating the deadman brake 63. The forklift 1 is thus braked.

The hydraulic device of FIG. 5 has the following advantages in addition to those of the device shown in FIGS. 1 and 2.

The deadman brake 63 is activated when the seat 71 is empty and is de-activated when the seat 71 is occupied. Thus, even if the operator leaves the forklift 1 without braking the forklift 1, the deadman brake 63 prevents the forklift 1 from moving without the operator. Further, if legally allowed, the deadman brake 63 may be used as a regular brake for the forklift 1. In this case, since the deadman brake 63 is automatically de-activated when the seat 71 is occupied, the forklift 1 is readily started or restarted.

The controller 55 changes the output of the main motor M1 in the range from the fourth value V4 to the second value V2 in accordance with the steering speed VH when performing only the "steering" procedure. In this state, the output of the main motor M1 is relatively small if the steering speed VH is relatively low, thus reducing power consumption. Accordingly, the hydraulic device of FIG. 5 consumes less power than the device of FIGS. 1 and 2.

It should be apparent to those skilled in the art that the present invention may be embodied in many other forms without departing from the spirit or scope of the invention. Particularly, it should be understood that the invention may be embodied in the following forms.

In the illustrated embodiments, the maximum output of the main motor M1 is equal to that of the auxiliary motor M2. However, if necessary, the motor M1, M2 may have different maximum outputs. It is preferred that the motors M1, M2 are selected to meet the requirements of an industrial vehicle in which a hydraulic device according to the present invention is installed.

In the illustrated embodiments, the second hydraulic pump 18 is directly connected to the first hydraulic pump 20. However, a clutch may be located between the second and first pumps 18, 20 for connecting these pumps 18, 20 only when necessary. In this case, the second hydraulic pump 18 is de-activated when not needed, thus further reducing power consumption.

In the illustrated embodiments, the controller 55 starts to drive the main motor M1 at the first output value V1 when the main switch 54 is turned on. The controller 55 switches the output of the main motor M1 to the second output value V2 when provided with a signal from the steering angle sensor 48. The controller 55 switches the output of the main motor M1 to the third output value V3 when the tilt lever 14 is moved to the forward or rearward tilting position. However, the output of the main motor M1 does not necessarily have to be controlled in this manner. For example, the output of the main motor M1 during the tilting procedure may differ from the output of the motor M1 during the lifting procedure. Further, the lift switches 52, 53 may be replaced by a sensor that continuously detects the operation amount of the lift lever 13, which is, for example, a potentiometer. The output of the main motor M1 is thus switched among three or more levels in accordance with the operation amount of the lift lever 13. Further, in this case, the controller 55 may control the output of the auxiliary motor M2 among a plurality of levels and thus changes the lifting speed among a plurality of levels. Alternatively, the output of the main motor M1 and the output of the auxiliary motor M2 may both be continuously altered in accordance with the operation amount of the lift lever 13.

Although only the main motor M1 is driven by the motor driver 56 in the illustrated embodiments, the auxiliary motor M2 may also be driven by the motor driver 56.

In the illustrated embodiments, hydraulic fluid is supplied to the locking circuit for the lift cylinder 4 when the operation of the forklift 1 is started. However, the present invention is not restricted to this structure.

In the illustrated embodiments, hydraulic fluid is supplied to the power steering device 16 and the hydraulic brake device 17, which are connected in parallel with each other, when the forklift 1 is started. However, hydraulic fluid may be supplied to other devices when the forklift 1 is started.

In the illustrated embodiments, the hydraulic brakes 26 do not necessarily have to be hydraulically controlled but may be mechanically controlled.

In the illustrated embodiments, the lift cylinder 4 is unlocked when the pilot check valve 43 is opened by the spool of the pilot switch valve 44, which is moved by fluid from the second hydraulic pump 18. However, the pilot check valve 43 may be, for example, an electromagnetic type and is controlled by the controller 55 to unlock the lift cylinder 4. This further reduces power consumption and decreases costs.

In the illustrated embodiments, the lift cylinder 4 is selectively locked and unlocked through hydraulic pressure. Further, the brake cylinder 26 is hydraulically controlled. However, the lift cylinder 4 may be selectively locked and unlocked in different manners, and the brake cylinder 26 may be controlled in different manners. For example, even after the forklift 1 is started, the motors M1, M2 may be both maintained in a de-activated state unless the steering wheel 12 or the lift lever 13 or the tilt lever 14 is operated.

In the illustrated embodiments, the third hydraulic pump 19 supplies hydraulic fluid only to the carriage device, which includes the lift cylinder 4 and the tilt cylinder 7. However, the third hydraulic pump 19 may supply hydraulic fluid to a hydraulic circuit for other devices connected in series or parallel with the hydraulic circuits for the cylinders 4, 7.

In the embodiment of FIGS. 5 and 6, the deadman brake 63 is a drum type. However, the deadman brake 63 may be other types such as a disk type. Further, the output of the main motor M1, which is varied in accordance with the steering speed VH, may be determined through computation, instead of using the map M. In this case, the first to fourth output values V1 to V4 must satisfy the following condition: first value V1<fourth value V4<second value V2<third value V3.

In the embodiment of FIGS. 5 and 6, the electromagnetic switch valve 66 is switched directly by the deadman sensor 72. However, the switch valve 66 may be switched in different manners. For example, the deadman sensor 72 may include a load sensor. In this case, the controller 55 judges whether the seat 73 is occupied or empty in accordance with a signal from the deadman sensor 72. The controller 55 then controls the electromagnetic switch valve 66 in accordance with the judgement.

In the embodiment of FIGS. 5 and 6, the output of the motor M1 is continuously varied when only the "steering" procedure is performed. However, the output of the motor M1 may be continuously varied when other procedures are combined with the "steering" procedure. For example, if only "normal speed lifting" or "forward tilting" or "rearward tilting" is performed, the output of the main motor M1 may be a fifth value, which is smaller than the third value V3 but larger than the second value V2. If any of the procedure is combined with "steering", the output of the main motor M1 is continuously varied in a range from the fifth value V5 to the third value V3.

Therefore, the present examples and embodiments are to be considered as illustrative and not restrictive and the invention is not to be limited to the details given herein, but may be modified within the scope and equivalence of the appended claims.

What is claimed is:

1. An industrial vehicle provided with a hydraulic device that operates a carriage device and a traveling device by supplying the carriage device and the traveling device with hydraulic fluid, wherein the hydraulic device comprises:

a first hydraulic pump for supplying the hydraulic fluid to the traveling device;

a second hydraulic pump for supplying the hydraulic fluid to the carriage device, wherein the second hydraulic pump and the first hydraulic pump together form a tandem pump;

a first motor for driving the first hydraulic pump and the second hydraulic pump;

a third hydraulic pump for supplying the hydraulic fluid to the carriage device; and a second motor, wherein the second motor drives the third hydraulic pump only when the amount of hydraulic fluid to be supplied to the carriage device is required to be greater than a predetermined amount.

2. The industrial vehicle as set forth in claim 1, wherein:
the hydraulic device further includes a controller;
the controller activates the first motor at an output selected from a plurality of predetermined levels varied in accordance with an operational condition of the traveling device and the carriage device; and
the controller activates at least the first motor of the first and second motors in accordance with an operation speed of the carriage device.

3. The industrial vehicle as set forth in claim 2, wherein:
the industrial vehicle is a forklift that includes a fork, and
the carriage device includes a lift cylinder for lifting and lowering the fork.

4. The industrial vehicle as set forth in claim 3, wherein:
the lift cylinder includes a lift locking circuit for preventing the fork from being lowered due to the weight of the fork; and
the lift locking circuit is operated in accordance with a discharge pressure of the second hydraulic pump.

5. The industrial vehicle as set forth in claim 2, wherein:
the traveling device includes a power steering device and a hydraulic brake;
the hydraulic device includes a steering valve for controlling the power steering device and a brake pressure control valve for controlling the hydraulic brake; and
the steering valve and the brake pressure control valve are connected in parallel with each other with respect to the third hydraulic pump.

6. The industrial vehicle as set forth in claim 2, further comprising:
a sensor for detecting whether an operator seat is occupied or empty;
a deadman brake; and
a brake control device, which de-activates the deadman brake when the sensor detects that the operator seat is occupied and activates the deadman brake when the sensor detects that the operator seat is empty.

7. The industrial vehicle as set forth in claim 2, wherein:
the traveling device includes a power steering device provided with a steering angle sensor that generates a signal associated to a steering angle; and
the controller determines a steering speed in accordance with the signal from the steering angle sensor and alters the output of the first motor in accordance with the steering speed.

8. The industrial vehicle as set forth in claim 3, wherein:
the carriage device includes a tilt cylinder for tilting the fork;
the tilt cylinder is supplied with the hydraulic fluid from the second hydraulic pump and the third hydraulic pump;
the lift cylinder is supplied with the hydraulic fluid from the second hydraulic pump and the third hydraulic pump; and
the hydraulic device includes:
  a lift valve for changing a direction in which the hydraulic fluid flows between the lift cylinder and the second and third hydraulic pumps;
  a tilt valve for changing a direction in which the hydraulic fluid flows between the tilt cylinder and the second and third hydraulic pumps; and
  a controller for operating the first motor such that a first output value, a second output value, and a third output value are achieved; wherein:
    the first output value is selected such that the amount of the hydraulic fluid discharged by the first hydraulic pump is sufficient for activating the hydraulic brake;
    the second output value is selected such that the amount of the hydraulic fluid discharged by the first hydraulic pump is sufficient for activating the power steering device; and
    the third output value is selected such that the amount of the hydraulic fluid discharged by the second hydraulic pump is sufficient for activating the lift cylinder and the tilt cylinder.

9. The industrial vehicle as set forth in claim 8, wherein:
the industrial vehicle includes a manipulating device for switching the lift cylinder between a normal speed lifting state and a high speed lifting state; and
the controller activates only the first motor when the normal speed lifting state is selected with the manipulating device while activating both of the first motor and the second motor when the high speed lifting state is selected with the manipulating device.

10. The industrial vehicle as set forth in claim 9, wherein:
the lift cylinder includes a lift locking circuit for preventing the fork from being lowered due to the weight of the fork; and
the lift locking circuit is activated in accordance with a discharge pressure of the second hydraulic pump.

11. The industrial vehicle as set forth in claim 8, wherein:
the hydraulic device includes a hydraulic fluid reservoir;
the traveling device includes a hydraulic brake and a power steering device;
the power steering device includes a steering cylinder and a steering valve, wherein the hydraulic fluid is supplied from the first hydraulic pump to the steering cylinder and is returned from the steering cylinder to a hydraulic fluid reservoir in accordance with operation of the steering valve; and
the hydraulic device includes a brake control valve, which supplies the hydraulic fluid from the first hydraulic pump to the hydraulic brake and circulates the hydraulic fluid from the hydraulic brake to the hydraulic fluid reservoir.

12. The industrial vehicle as set forth in claim 11, wherein the controller changes an output of the first motor continuously in a range from the first output value to the second output value in accordance with the signal from the steering angle sensor.

13. The industrial vehicle as set forth in claim 8, further comprising:
a hydraulic fluid reservoir;
a deadman brake;
a brake cylinder for selectively activating and de-activating the deadman brake;
an electromagnetic valve, which has a first operational state and a second operational state, wherein the first operational state supplies the hydraulic fluid from the first hydraulic pump to the brake cylinder, and the second operational state returns the hydraulic fluid from the brake cylinder to the hydraulic fluid reservoir; and
a sensor for detecting whether an operator seat is occupied or empty;
wherein the electromagnetic valve is switched between the first operational state and the second operational state in accordance with a result obtained by the sensor.

* * * * *